(12) United States Patent
Beth Halachmi et al.

(10) Patent No.: US 11,992,027 B2
(45) Date of Patent: May 28, 2024

(54) APPLIANCE AND CAPSULE CONTAINING A FOOD PRODUCT

(71) Applicant: SOLO GELATO LTD., Hila (IL)

(72) Inventors: Barak Beth Halachmi, Hila (IL); Eynav Kliger, Betzet (IL)

(73) Assignee: SOLO GELATO LTD., Hila (IL)

( * ) Notice: Subject to any disclaimer, the term of this patent is extended or adjusted under 35 U.S.C. 154(b) by 1313 days.

(21) Appl. No.: 16/309,589

(22) PCT Filed: Jul. 6, 2017

(86) PCT No.: PCT/IL2017/050755
§ 371 (c)(1),
(2) Date: Dec. 13, 2018

(87) PCT Pub. No.: WO2018/008028
PCT Pub. Date: Jan. 11, 2018

(65) Prior Publication Data
US 2019/0239534 A1 Aug. 8, 2019

(30) Foreign Application Priority Data
Jul. 7, 2016 (IL) .......................................... 246656

(51) Int. Cl.
*A23G 9/28* (2006.01)
*A23C 13/00* (2006.01)
(Continued)

(52) U.S. Cl.
CPC ............... *A23G 9/281* (2013.01); *A23G 9/22* (2013.01); *A23G 9/28* (2013.01); *A23G 9/52* (2013.01);
(Continued)

(58) Field of Classification Search
CPC . A23G 9/28; A23G 9/30; A23G 9/045; A23G 9/20; A23G 9/228; A23G 9/281;
(Continued)

(56) References Cited

U.S. PATENT DOCUMENTS 5,349,825 A 9/1994 Duke et al.
9,968,113 B2 * 5/2018 Lazzarini ................. A23G 9/28
(Continued)

FOREIGN PATENT DOCUMENTS

EP 2 000 062 A1 12/2008
EP 2 401 945 A1 1/2012
(Continued)

*Primary Examiner* — Chris Q Liu
(74) *Attorney, Agent, or Firm* — Vorys, Sater, Seymour and Pease LLP; Anthony P. Venturino; Maryellen Feehery Hank

(57) ABSTRACT

Provided is an appliance including a receptacle for a capsule that contains a food substance; a processing unit for processing the food substance into an edible food product; an adapter unit configured for coupling to the capsule and drawing the food substance therefrom; wherein said adapter unit includes an adapter being at an end of a conduit and being configured for coupling with a tube that extends from the capsule's interior, the conduit leading to the processing unit and being linked to a vacuum source for emptying the content of the capsule by drawing the food substance out of the capsule through the tube into the conduit and transferring it through said conduit into the processing unit.

9 Claims, 4 Drawing Sheets

(51) Int. Cl.
*A23G 9/04* (2006.01)
*A23G 9/22* (2006.01)
*A23G 9/52* (2006.01)
*B65D 17/42* (2006.01)
*B65D 85/78* (2006.01)

(52) U.S. Cl.
CPC ............. *B65D 17/42* (2018.01); *B65D 85/78* (2013.01); *A23C 13/00* (2013.01); *A23G 9/04* (2013.01); *B65D 2517/0049* (2013.01)

(58) Field of Classification Search
CPC . A23G 9/12; A23G 9/22; A23G 9/282; A23G 9/08; A23G 9/283; A23G 9/305; A23G 9/04; A23G 9/166; A23G 9/224; A23G 9/227; A23G 9/52; A23G 9/163; A23G 9/42; A23G 9/48; A23G 9/503; A23G 9/00; A23G 9/106; A23G 9/14; A23G 9/16; A23G 9/222; A23G 9/24; A23G 9/287; A23G 9/288; A23G 9/40; A23G 9/46; A23G 9/485; A23G 9/506; A47J 31/407; A47J 31/3628; A47J 31/22; A47J 31/3695; A47J 31/3623; A47J 31/00; A47J 31/06; A47J 31/0642; A47J 31/0668; A47J 31/0673; A47J 31/20; A47J 31/3614; A47J 31/3633; A47J 31/469; A47J 31/52; A47J 2043/04472; A47J 2202/00; A47J 27/21041; A47J 27/2105; A47J 27/21083; A47J 31/002; A47J 31/005; A47J 31/0605; A47J 31/0615; A47J 31/0647; A47J 31/24; A47J 31/34; A47J 31/36; A47J 31/40; A47J 31/44; A47J 31/4417; A47J 31/4425; A47J 31/4457; A47J 31/462; A47J 31/465; A47J 31/56; A47J 31/60; A47J 36/2416; A47J 36/2466; A47J 36/2472; A47J 36/2494; A47J 36/321; A47J 39/025; A47J 41/0044; A47J 41/0094; A47J 43/046; A47J 43/07; A47J 43/0716
USPC ......... 99/295, 485, 468, 483, 275, 280, 283, 99/287, 300, 451, 453, 470, 484, 494; 426/231, 431, 524, 112, 433, 435, 115, 426/383, 393, 416, 474, 519, 521, 565, 426/590, 87

See application file for complete search history.

(56) References Cited

U.S. PATENT DOCUMENTS

| | | | |
|---|---|---|---|
| 10,588,330 B2* | 3/2020 | Cocchi | A23G 9/12 |
| 10,617,130 B2* | 4/2020 | Cocchi | A23G 9/281 |
| 2002/0048626 A1 | 4/2002 | Miller et al. | |
| 2009/0120306 A1* | 5/2009 | DeCarlo | A23G 9/224 62/340 |
| 2010/0203208 A1 | 8/2010 | Yoakim et al. | |
| 2015/0329282 A1 | 11/2015 | Bartoli et al. | |
| 2016/0316781 A1* | 11/2016 | Zappoli | A23G 9/52 |

FOREIGN PATENT DOCUMENTS

| | | | | |
|---|---|---|---|---|
| JP | 2008-220372 A | 9/2008 | | |
| JP | 2016-208962 A | 12/2016 | | |
| JP | 2017-195876 A | 11/2017 | | |
| WO | 2012/121421 A1 | 9/2012 | | |
| WO | 2014/057094 A1 | 4/2014 | | |
| WO | 2015/022678 A1 | 2/2015 | | |
| WO | 2015/092637 A1 | 6/2015 | | |
| WO | 2015/104610 A1 | 7/2015 | | |
| WO | WO-2015104610 A1 * | 7/2015 | | A23G 9/08 |
| WO | 2015/117156 A1 | 8/2015 | | |
| WO | WO-2016096730 A1 * | 6/2016 | | A47J 31/0673 |

\* cited by examiner

APPLIANCE AND CAPSULE CONTAINING A FOOD PRODUCT

TECHNOLOGICAL FIELD

The current disclosure concerns an appliance of the kind that can process a food substance into an edible food product. The disclosure also concerns capsules that contain a food substance that may be used in such appliance.

BACKGROUND ART

References considered to be relevant as background to the presently disclosed subject matter are listed below:
WO 2012/121421
WO 2015/022678
U.S. Pat. No. 5,349,825
WO 2014/057094
US 2010/0203208
WO 2015/117156

Acknowledgement of the above references herein is not to be inferred as meaning that these are in any way relevant to the patentability of the presently disclosed subject matter.

BACKGROUND

Preparation of ice cream generally involves mixing edible ingredients for forming a mixture, adding gas/air into the mixture (sometimes a by-product of the mixing itself) in order to soften the texture of the mixture and cooling of the mixture.

At present, the majority of ice creams are produced in an industrial process. In this process, ice cream is produced in large volumes and then separated into packages of various sizes and shipped and sold as such to the end users.

There are also known machines for domestic preparation of ice cream, allowing the user to prepare ice cream from a mixture of edible ingredients of his liking.

In principle, in such domestic ice cream machines, the user prepares the ingredients mixture and introduces the mixture into the machine which then cools the mix while mixing. Some machines have a built-in cooling arrangement while others only perform mixing, wherein the user is required to transfer the mix, or the machine itself, into the freezer (or any other cooling chamber).

GENERAL DESCRIPTION

The present disclosure concerns an appliance that is configured for processing a food substance, originally contained in a capsule, into an edible food product. The appliance is typically sized and configured for preparing single serves (e.g. one serving) of the edible food product. A particular, non-limiting example of an edible food product, is a cooled product, such as ice-cream, sorbet, frozen-yogurt, cooled non-frozen whipped products (such as whipped yogurts), and similar products, which are processed in the manner generally described in PCT patent publications WO 2012/121421 and WO 2015/022678. By one embodiment, the food substance in the capsule may be used as such for processing into an edible food product. In other embodiments, the food substance may be mixed in a mixing chamber of the appliance with one or more other substances, such as the substance contained in a different capsule or a liquid, e.g. water, provided from an external reservoir or directly by the user. A particular embodiment of the appliance is one wherein the food substance drawn from the capsule is processed to prepare a single serve food product, for example, a single serve portion of ice-cream.

The appliance of this disclosure comprises a receptacle for a capsule that contains a food substance, a processing unit configured for processing the food substance into an edible food product, and an adapter unit configured for coupling to the capsule and drawing the food substance therefrom. Unique features of the appliance are to be found in the adapter unit. The adapter unit comprises an adapter, fitted at the end of a conduit and configured for fitting to or associating with a tube that extends from the capsule's interior; e.g. a tube protruding out of the capsule through the capsule's top or a tube with an upper end that is flush with an upper face of the capsule and has an upper opening that is covered by a portion of the capsule's closure. In the latter case, the adapter may be configured for breaking said portion and forming a fluid communication with said the tube's upper end. The conduit of the adapter unit leads to the processing unit, and is also linked to a vacuum source or a pump.

Application of vacuum or operation of the pump draws the food substance out of the capsule and transfers it through said conduit into the processing unit for processing into the edible food product.

According to some embodiments, the conduit comprises or is fitted with a valve for controllably permitting entry of air, typically pressurized, to clean the conduit. Such entry of air maybe used to clean the conduit from residual food substance after drawing has been completed. Alternatively (or concomitantly), this valve may be used to introduce a defined quantity of pressurized air into the conduit during drawing of the food substance from the capsule, thereby partially aerating the food substance prior to into introduction into the processor.

The tube that extends from the capsule has a bottom end which is open at the bottom portion of the capsule, facilitating drawing of the entire contents of the capsule. The tube is configured such that opening at its bottom end is dipped within the food substance during the entire drawing process. Typically, the capsule's entire content is emptied (by application of vacuum or operation of the pump) in a single draw; although, by other embodiments, the capsule content may be drawn in portions. This may be achieved through controlled drawing, for example, drawing for a short defined period of time, sufficient to draw only a portion of the food substance from the capsule; or, alternatively, the capsule's tube may be configured for vertical displacement, such that its bottom end is positioned each time at a different level to draw out the food substance above this level.

In some embodiments, typically when the tube is made of a substantially rigid material or construct, the capsule may be pierced (e.g. at the capsule's closure or one of the capsule's walls) to form an opening (other than that of the tube) into the capsule's interior for entrance of air during drawing. A piercing unit for piercing a capsule's closure may also be comprised in the appliance. However, it is of note that due to the positioning of the opening at the bottom end of the tube within the food substance during drawing, the operation of vacuum or pump draws only the food substance from the capsule through the tube and into the adaptor, without drawing air that is introduces into the capsule.

The food substance (i.e. the content of the capsule) may be drawn from the capsule, by an embodiment of this disclosure, without introduction of a carrier fluid (liquid or gas) into the capsule during the drawing process. In other words, the content of the capsule is emptied from the capsule through the tube and into the conduit without the assistance of a carrier fluid passing through the capsule.

In some embodiments, the capsule may be collapsible, e.g. made of a pliable material (such as a small sachet or made of flexible plastic material), in which case no piercing may be required as drawing out the content of the capsule will cause its gradual collapse until its entire content is drawn into the processing unit.

The tube that leads into the capsule's interior may be a priori part of the capsule (i.e. integral with the capsule), in which case the tube is typically sealed until use. In such a case, either the user or a tube-seal breaking-unit in the appliance is operates to either break or rupture the seal, or even cut the tube below the seal, to permit drawing of the food substance.

In other embodiments, the capsule and the tube are provided as a kit, and prior to inserting the capsule into the appliance's receptacle, a user pushes the tube through the capsule's top end until the tube's bottom end is arrested by the capsule's bottom wall. Alternatively, the user may insert a single-use tube into the appliance, followed by the insertion of the capsule into the receptacle; the appliance may then have a functionality that pushes the tube into the capsule.

In another embodiment, the appliance is provided with a cartridge of single-use, disposable tubes, and a tube-inserting unit associated therewith. Once a capsule is introduced into the receptacle, the tube-inserting unit may extract a tube out of the cartridge and push it through the capsule's top end to enable the adapter unit to associate with the capsule and draw its content.

The appliance typically includes a dedicated capsule receptacle, and by some embodiments the receptacle is configured for receiving two or more capsules which may be used together, in the case where each one contains a different food substance that has to be processed together to prepare the edible food product, or may be used one after the other for the same or different edible food product. In the latter case, there may be a functionality for moving the capsule towards the adapter or alternatively for moving the adapter from one capsule to the other in a desired drawing order.

As the association between the adapter unit and the capsule is made via the tube, the extraction of the food substance from the capsule is substantially independent of the capsule's shape and volume. Thus, the receptacle may be adapted to receive one or more capsules of various shapes and sizes.

The appliance may further comprise a data reader and a control unit for receiving data and applying the proper process parameters based thereon. The data is typically carried by the capsule, such that once received in the appliance, the data carried by the capsule is read by the data reader, causing the controller to operate the appliance in a processing sequence suitable for the specific capsule and the desired final edible product. In addition, to processing parameters, the data may also determine the operation of the valve fitted onto the conduit to control the amount of air introduced into the conduit and the timing of such introduction.

In the above described, the term "unit" used with respect to a number of parts of the appliance should be understood as referring either to an independent unit which may include one or more elements. To achieve the said functionality it should be understood that a unit may also be included as part of another unit, e.g. a piercing unit may be a member or group of elements within and thus part of the adapter unit.

This disclosure also provides a capsule that comprises food substances for use in an appliance, as described herein. The capsule typically, but not exclusively, comprises an integral tube of the kind specified, with a breakable or rupturable seal. The bottom end of the capsule's tube is typically at or positioned proximal to the capsule's bottom.

The capsule is typically a disposable capsule and intended for single use. In some embodiments, the capsule contains food substance in an amount suitable for producing a single-serve of the cooled edible product (for example, for producing a volume of single scope or a cup of ice-cream).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
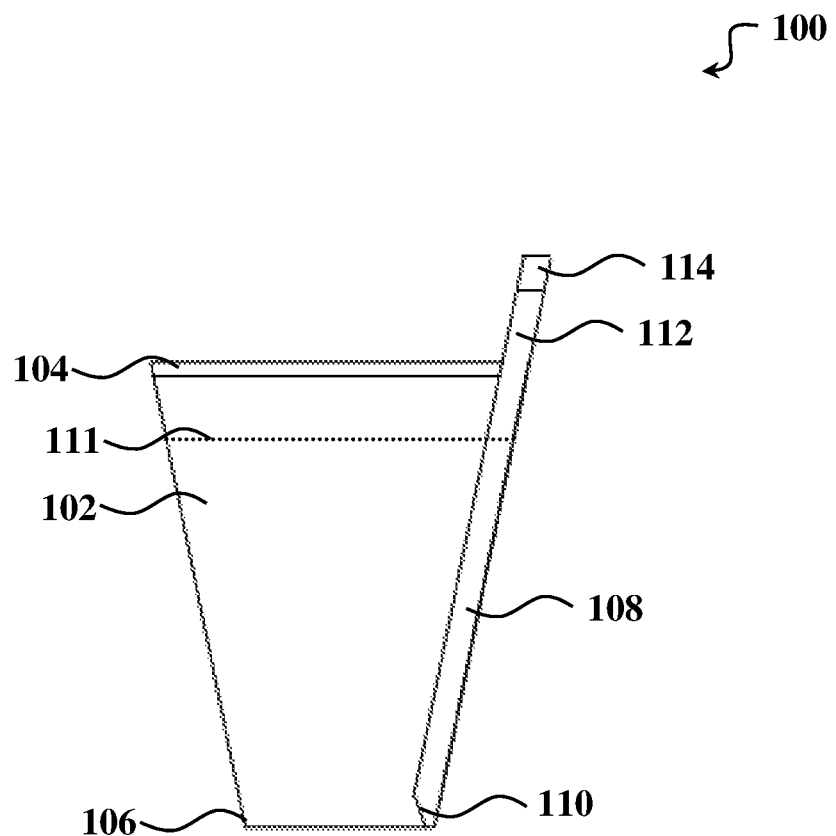
FIG. 1 is a schematic cross-section of a capsule fitted with an integral tube according to an embodiment of this disclosure.

FIG. 1 shows a capsule for use in an appliance of this disclosure. In the embodiment shown in FIG. 1 the tube is integral with the capsule, as will be explained. However, it is also contemplated by this disclosure that the tube will be a stand-alone element, which is associated with the capsule by the user prior to insertion of the capsule into the appliance or by a tube-inserting unit within the appliance.

Capsule 100 has a hollow capsule body 102, which may be made of a rigid or pliable material. The capsule's body is typically fitted with a pierceable or rupturable seal 104 at the capsules top end. Seal 104 is typically made of plastic or thin metal foil and is fitted onto the capsule's top after the capsule's body is filled with the desired food substance.

Protruding from the top end of the capsule is a top end 112 of integral tube 108. Tube 108 extends from the top end 112 to a bottom end 110, which is located proximal to the capsules bottom wall 106. The tube is configured such that its bottom end is maintained dipped within the food substance, i.e. below the top level 111 of the food substance contained within the capsule.

The tube's top end 112 is formed with a breakable, rupturable or removable seal 114, that may be broken, ruptured or removed by the user prior to insertion of the capsule into the appliance's receptacle. Alternatively, this section may be ruptured or removed by a dedicated unit within the appliance once the capsule is inserted into the receptacle and/or once the capsule is to be utilized for the preparation of the edible product. It is of note that such a unit may be a stand-alone unit within the appliance or an element in the adapter unit.

In embodiments where the tube is not an integral part of the capsule, either the user or a tube-inserting unit within the appliance inserts a tube into the capsule through the capsule's seal 104.

Figure 2:
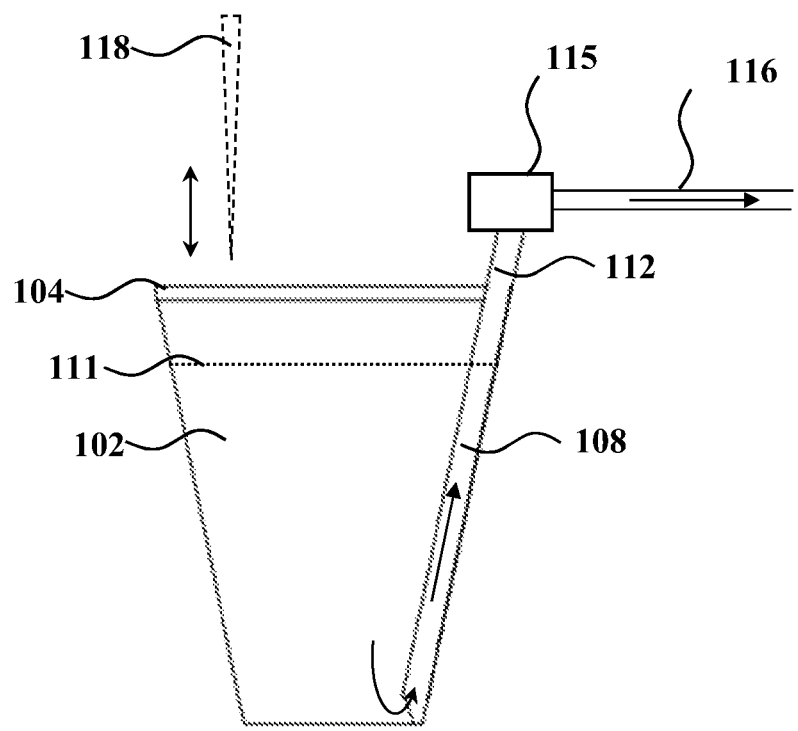
FIG. 2 is a schematic cross-section of the capsule of FIG. 1 associated with the adapter after insertion into the appliance's receptacle.

Once inserted into the receptacle and identified by the controller as a suitable capsule, the adapter 115 is associated with the unsealed top end 112 of the tube 108, as seen in FIG. 2. As the bottom end 110 of tube 108 is positioned proximal to the bottom wall 106 of the capsule and maintained below the top level 111 of the food substance during the drawing process, such that operation of vacuum or a pump draws substantially all of the content of the capsule by the adapter via the tube, through conduit 116 into the processing unit. As the bottom end 110 of the tube is maintained within the food substance throughout the drawing process, proper drawing does not require the addition of a carrier fluid (e.g. a liquid or a gas) in order to allow the adapter to transfer the food substance substantially completely from the capsule into the mixing chamber of the appliance. In case the capsule is not collapsible, the seal 104 may be pierced by a piercing member 118 to permit entry of ambient air into the capsule during drawing of the food substance from the capsule. It is also contemplated that the capsule may include an embedded puncturing mechanism or a pressure valve, such that once vacuum is applied by the adapter unit puncturing or opening of the pressure valve occurs in order to permit entry of air into the capsule.

Figure 3:
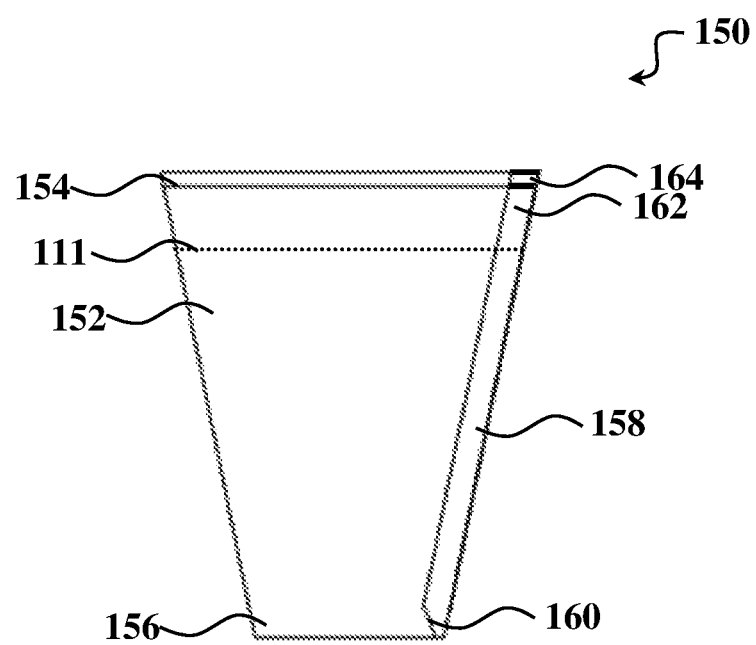
FIG. 3 is a schematic cross-section of a capsule of another embodiment of this disclosure.

FIG. 3 shows another capsule suitable for use in an appliance of this disclosure. In the embodiment shown in FIG. 3, the tube 158 is integral with the capsule 150, however the top end 162 of the tube 158 is flush with the upper end of the capsule. The top end of the capsule is covered with a portion 164 of the capsules closure 154, such that association with the adapter unit causes breaking or rupturing of the portion 164 to thereby establish a fluid communication with the conduit of the appliance via the adapter. Portion 164 may be ruptured by a piercing or rupturing functionality that may be a part of the adapter unit. Alternatively, portion 164 may be made of a pliable material or have a reduced thickness, such that once vacuum is applied by the adapter unit portion 164 ruptures.

Figure 4:
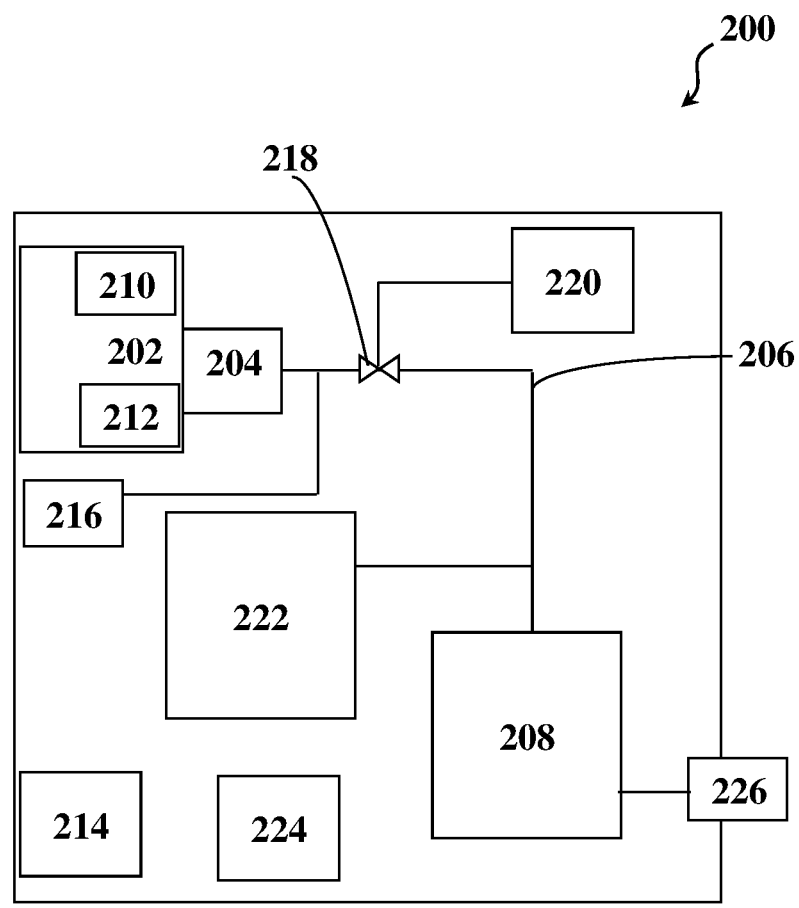
FIG. 4 is a schematic illustration of an appliance according to an embodiment of this disclosure.

FIG. 4 is a block diagram of an appliance according to an embodiment of this disclosure. Appliance 200 comprises a receptacle 202 that is configured to receive at least one, at times two or more, capsules that contain a food substance to be processed into an edible food product, such as that depicted in FIG. 1. The receptacle 202 is linked with a processing unit 208 via a conduit 206 that is fitted at one end with an adapter 204; the adapter is configured for association with a capsule's tube, as explained above.

The receptacle 202 may include, or be configured with, additional functionalities, generally designated the numeral 210, such as a seal piercing unit, a tube's top end removing unit, a tube inserting unit, etc. The receptacle is typically further associated (or comprises) a data reader 212, that is configured to identify data carried by the capsule. The data is transmitted from the data reader to controller 214, which controls the operation of the appliance, and induces the appliance to perform a sequence of process operations for producing the edible food product from the food substance.

Once associated with the top end of the tube, vacuum unit (or pump) 216 is operated to draw the food substance from the capsule, through the adapter into conduit 206, which leads into processing unit 208. Conduit 206 may be fitted with a valve 218 for controlling insertion of ambient or pressurized air (by pressurized air source 220) into conduit 206, such that air may be introduced into the conduit after completion of drawing the food substance from the capsule. Such introduction of air maintains conduit 206 empty of food substance between operational cycles of the appliance, eliminating the need to clean the conduit between cycles of operation.

The appliance may further comprise reservoirs 222 of additional food ingredients, such as water, milk, cream, etc. In addition, the appliance typically comprises a cooling unit, generally designated by the numeral 224, that is associated with the processing unit for cooling the ingredients therein during the food product preparation process. Once prepared, the food product is emptied from the processing unit via outlet 226.

The invention claimed is:

1. An appliance for processing a food substance into a cooled edible food product, the appliance comprising
    a receptacle for receiving a capsule that contains said food substance;
    a vacuum;
    a conduit; and
    an adapter unit configured for coupling to the capsule and transferring the food substance therefrom and transferring the food substance from the capsule into the conduit; wherein
    said adapter unit comprises an adapter being at an end of the conduit and being configured for coupling with a tube that extends from the capsule's interior, the conduit being linked to said vacuum to permit transferring of the food substance out of the capsule through the tube into the conduit and to thereby transfer the food substance through said conduit,
    the vacuum being configured for drawing only the food substance from the capsule by said adapter unit without introducing a carrier fluid into the capsule.

2. The appliance of claim 1, wherein the conduit comprise a valve for controllably permitting entry of ambient air to clean the conduit from residual food substance.

3. The appliance of claim 1, wherein the tube has an opening at a bottom end thereof and is configured such that the opening at its bottom end is dipped within the food substance during the transferring process.

4. The appliance of claim 1, wherein the receptacle is configured for receiving two or more capsules.

5. The appliance of claim 1, comprising a piercer for piercing a capsule closure.

6. The appliance of claim 1, wherein the appliance is an ice-cream preparation appliance.

7. A system comprising an appliance according to claim 1, and at least one capsule that contains a food substance processable in the appliance into a cooled edible food product.

8. The system according to claim 7, wherein the capsule comprises a tube extending from the capsule's interior and having a breakable or rupturable closure, and the tube being configured for associate with the adapter unit of the appliance for transferring of only the food substance from the capsule into the conduit of the appliance by application of said vacuum through the adapter and without introducing a carrier fluid into the capsule.

9. The system according to claim 7, further comprising a tube, configured for insertion into the capsule, and having a breakable or rupturable closure, the tube being configured for associate with the adapter unit of the appliance for transferring of only the food substance from the capsule into the conduit of the appliance by application of said vacuum through the adapter unit and without introducing a carrier fluid into the capsule.

* * * * *